Figure 1:
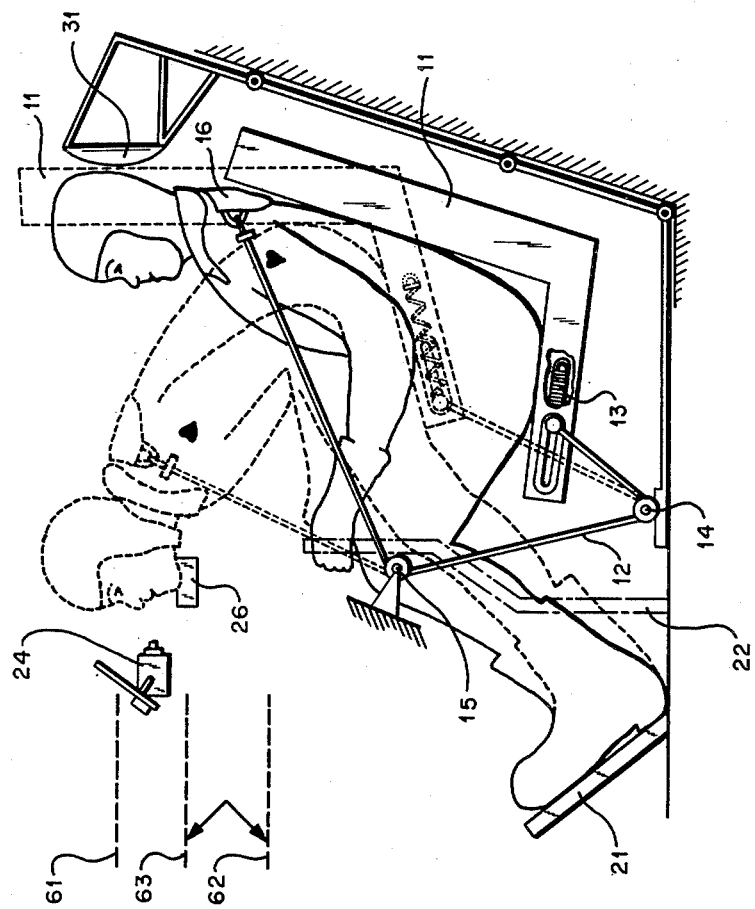

April 26, 1955

W. A. BRADLEY ET AL 2,707,087

METHOD AND MEANS FOR INCREASING AIRPLANE PILOT'S
RESISTANCE TO ACCELERATION FORCES

Filed Dec. 15, 1953

2 Sheets-Sheet 1

INVENTORS
WILLIAM A. BRADLEY
REUBEN FLANAGAN GRAY
ATTORNEYS

April 26, 1955   W. A. BRADLEY ET AL   2,707,087
METHOD AND MEANS FOR INCREASING AIRPLANE PILOT'S
RESISTANCE TO ACCELERATION FORCES
Filed Dec. 15, 1953   2 Sheets-Sheet 2
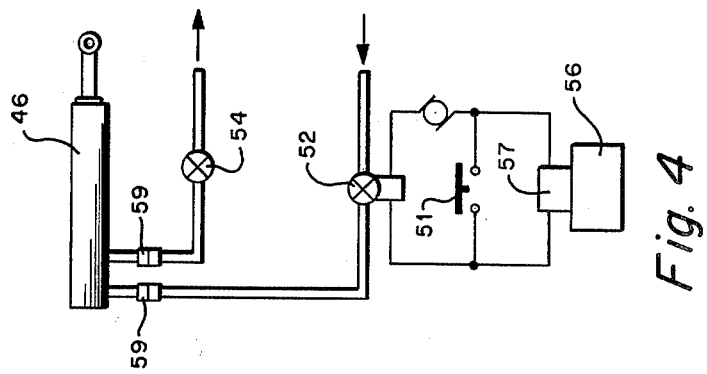
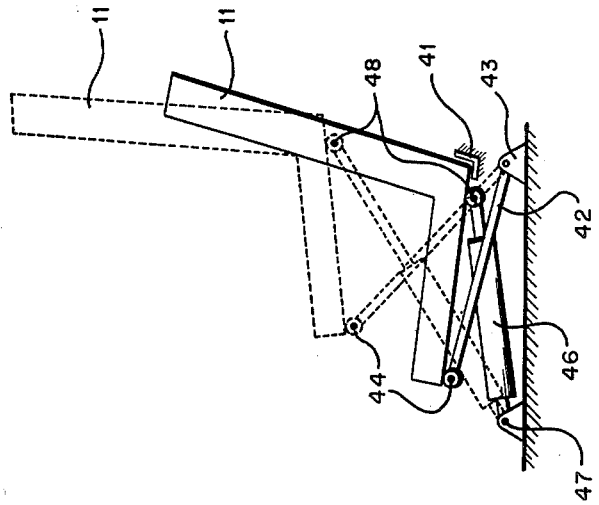
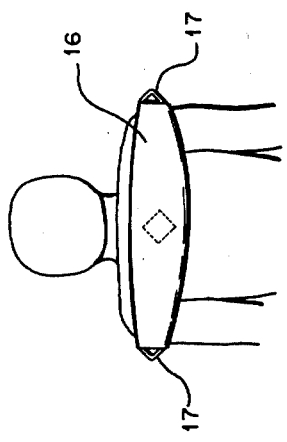
INVENTORS
WILLIAM A. BRADLEY
REUBEN FLANAGAN GRAY
ATTORNEY

United States Patent Office 2,707,087
Patented Apr. 26, 1955

2,707,087

METHOD AND MEANS FOR INCREASING AIRPLANE PILOT'S RESISTANCE TO ACCELERATION FORCES

William A. Bradley, North Wales, and Reuben Flanagan Gray, Levittown, Pa.

Application December 15, 1953, Serial No. 398,446

6 Claims. (Cl. 244—122)

(Granted under Title 35, U. S. Code (1952), sec. 266)

The invention described herein may be manufactured and used by or for the Government of the United States of America for governmental purposes without the payment of any royalties theron or therefor.

This invention relates to a method and means for increasing an airplane pilot's resistance to the adverse effects of high angular acceleration forces to which he may be subjected in flight. More particularly, the method involves selectively changing the pilot's position within an airplane in a certain predetermined manner and the means comprises an adjustable seat assembly for alternately placing a pilot either in the normal forwardly facing sitting position or in a raised and forwardly tilted position.

The fact that modern airplanes have been successfully designed to withstand extremely high angular acceleration loads during rapidly executed maneuvers at high speeds emphasizes a serious limitation on the use of such airplanes because of the pilot's limited ability to withstand the large acceleration forces exerted upon his body in the course of maneuvers involving rapid changes of direction at extremely high speeds. Consequently, it has become necessary to provide means in modern airplanes to increase the resistance of the pilot to the adverse effects induced by these acceleration forces. Aside from the so called G-suit worn by pilots and arranged to apply pressure to the body in critical areas, attempts have been made to increase the resistance of the human body to high acceleration forces by modifying the position of the pilot. These modified positions include pulling the pilot's legs up against his chest, having the pilot stoop within the narrow limits permitted with conventional shoulder straps, and using either prone or supine seat arrangements. All of these positions either have a very limited beneficial effect or place the pilot in an extremely unnatural position in which he is both extremely uncomfortable and severely handicapped in the operation of the airplane. Moreover, particularly with respect to the use of prone or supine position, extensive modifications of the airplane and the control system therefore is absolutely mandatory to accommodate these modified seats.

The present invention contemplates the use of an adjustable seat in which the pilot is normally disposed in the conventional upright sitting position and provided with actuating means for raising the seat and simultaneously tilting it forward, operable either manually in anticipation of high acceleration loads or automatically in response thereto.

An object of this invention is the provision of an improved adjustable pilot's seat for airplanes arranged to increase the pilot's resistance to high acceleration loads.

Another object of this invention is the provision of an adjustable pilot's seat for airplanes which may be incorporated in existing conventional airplanes with minimum modification of the airplane structure and of the controls therefore.

Still another object is the provision of an adjustable pilot's seat for airplanes in which the pilot may normally be seated in the conventional upright sitting position except for short intervals during which he is subject to high acceleration loads.

A final object of this invention is to provide an automatically adjustable pilot's seat assembly for airplanes operable in response to increasing acceleration loads to move the pilot from a normal upright sitting position into a forwardly crouched position.

The exact nature of this invention as well as other objects and advantages thereof will be readily apparent upon consideration of the following application along with the annexed drawings in which:

Fig. 1 is a schematic representation of a preferred embodiment of the instant invention showing both the normal sitting position of a pilot and the forwardly crouched position, Fig. 2 shows a preferred embodiment of the shoulder yoke in the position in which it is attached to the pilot's clothing, Fig. 3 is a diagrammatic representation of the pilot's seat assembly incorporated in the instant invention and of the actuating mechanism for adjusting the position of the seat assembly, and Fig. 4 is a diagrammatic representation of a preferred embodiment of an automatic hydraulically operated system for adjusting the position of the seat assembly.

Referring now to the drawings, wherein like reference numerals designate like or corresponding parts throughout the several views, there is shown in Fig. 1 a representation of a pilot's seat assembly 11 in its normal position as represented by solid lines and in its raised and tilted position as represented by dotted lines. The movement of this seat assembly between these two positions may be accomplished by means of an actuating mechanism such as that shown in Fig. 3 and described below in relation thereto. Operation of the actuating mechanism may be controlled either manually or by means of an automatic system such as that shown in Fig. 4 and described in detail below. A pair of flexible cables 12 resiliently attached at one end to the opposite sides of the seat assembly by means of tension spring 13 are passed over rotatable pulley wheels 14 and 15 mounted upon relatively fixed supporting members and connected at the other ends to opposite ends of the yoke member 16 located behind a pilot's shoulders in the manner indicated best in Fig. 2. With this arrangement, as the seat is moved from its normal position represented in solid lines to its raised and tilted position represented in dotted lines, the flexible cables and the yoke attached thereto are shifted from the position shown in solid lines to the position shown in dotted lines to draw the pilot forward from an upright sitting position shown by a representation in solid lines to a forwardly crouched position shown by a similar representation in dotted lines. It should be noted that this shift in the pilot's position does not substantially displace his hands and feet in relation to conventional aircraft controls such as the rudder pedals 21 and the control stick 22. Moreover, a conventional gunsight assembly may conveniently be so located that the pilot's eye is in close proximity to the gunsight 24 when he is moved into the forwardly crouched position. In order to establish a steady relationship between the pilot's eye and the gunsight, a chin rest 26 may be fixedly secured to suitable supporting structure so that it is located as shown in Fig. 1.

When a seat assembly constructed in accordance with the teachings of this invention is installed in an airplane it may become necessary to eliminate the headrest assembly normally connected directly to the back of the seat assembly and substitute a headrest assembly 31 fixedly secured to the airplane structure adjacent to the seat assembly, in order to prevent interference between the upper end of the seat assembly and the cockpit canopy when the seat assembly is moved into its raised and tilted position.

The yoke member 16 is arranged as shown in Fig. 2 to provide means for absorbing the pull exerted by the cables 12 without impairing the pilot's freedom of movement. For this purpose the yoke member 16 should be made from rigid material shaped to fit comfortably across the pilot's shoulders, and should be provided with rings or aperatures 17 at its opposite ends for connection to the ends of cables 12. This yoke may be either permanently or removably attached to the pilot's clothing.

Fig. 3 is a diagrammatic representation of the adjustable seat assembly 11 and the associated actuating mechanism shown in its normal upright position by a solid line representation and in its raised and tilted position by a dotted line representation. The seat assembly 11 may be supported in its normal upright position by means of a fixed bracket or rest 41 disposed as shown adjacent its rear edge and by a plurality of pivotally connected rods 42 attached at one end to the forward edge of the seat assembly by means of the pivotal connection 44 and pivotally connected at the other end to a fixedly secured bracket 43 attached to the adjacent airplane structure. The seat assembly 11 may be moved to its raised and tilted position by one or more coordinated actuating cylinders 46 connected at one end to the seat assembly adjacent its rear edge by means of pivotal connection 48 and pivotally connected at the other end to a fixed bracket 47 attached to adjacent airplane structure. With the arrangement shown in Fig. 3, the extension of the actuating cylinder 46 by application of hydraulic pressure thereto is effective to move the seat assembly with a pilot seated therein from its normal upright position to the raised and tilted position.

The actuating cylinder 46 may be operated manually as desired by the pilot by closing the switch 51 to open the solenoid valve 52 through which hydraulic pressure is introduced to the actuating cylinder 46. The actuating cylinder 46 could alternatively be operated automatically by an accelerometer assembly 56 effective through a suitable time delay mechanism 57 to open the solenoid valve 52 for the desired time interval. The seat assembly 11 can be returned to its normal upright position by opening the hydraulic return valve 54 after excessively high acceleration loads are no longer being imposed upon the pilot. If the device comprising the instant invention is to be combined with a seat ejecting mechanism, the hydraulic lines of the system shown in Fig. 4 may be provided with break-away couplings 59.

Design details of the frame means to which the pulley supporting members and the various fixed brackets are attached have been omitted from this description and from the showing in the drawings, because they form no part of the present invention and they may be modified as necessary to suit installations in various airplanes. For example, in airplanes which do not incorporate a seat ejection mechanism, the frame means may comprise any suitable point of attachment upon the fuselage structure. However, where a seat ejection mechanism is provided the frame means preferably comprise portions of the seat ejection framework so that the entire adjustable seat assembly comprising the instant invention, including the restraining cables and the yoke, is automatically discharged from the airplane by operation of the ejection mechanism to eliminate the possibility of entangling the pilot in restraining means attached to and remaining in the fuselage.

In operation, the instant invention supports an airplane pilot in a normal sitting position during straight and level flight. However, in anticipation of maneuvers such as aerial combat during which high angular acceleration loads will inevitably be imposed upon the airplane and the pilot therein, the pilot may move the seat assembly 11 from its normal position to its raised and tilted position by actuating the switch 51. Alternatively, where an accelerometer assembly 56 is provided the seat will be moved automatically to the raised and tilted position as the angular acceleration loads initially increase to a point at which the pilot's efficiency would be impaired without the provision of effective means to combat the adverse effects of high acceleration loads. In the forwardly crouched position achieved by using the instant invention, the pilot remains in a position with good visibility and in which he can maintain control of the airplane and at the same time substantially increases his resistance to the adverse effects of large angular acceleration loads.

This increased resistance to acceleration loads is obtained in the manner indicated graphically in Fig. 1 by substantially reducing the hydrostatic head of the blood above the heart. In both the normal sitting position and in the forwardly crouched position the pilot's brain is located on the level designated by the dash line 61, while movement from the sitting to the crouched position shifts his heart from the level indicated by the dash line 62 to the level indicated by the dash line 63 resulting in a substantial reduction in the vertical distance between his heart and his brain. Thus, the point at which a pilot "blacks out" for want of a sufficient supply of blood to the brain is postponed.

Thus, the present invention provides a method and suitable apparatus for increasing an airplane pilot's resistance to high acceleration loads imposed upon his body by rapid maneuvers of the airplane in which he is flying. In this manner, employment of the teachings of the present invention permit greater utilization of the inherent high maneuverability of modern military airplanes both during fixed gunnery runs, thus increasing the percentage of hits upon an evasive target, and during other combat maneuvers in which the maintenance of maximum maneuverability is a critical factor. Moreover, these desirable results are obtained with a minimum of discomfort to the pilot and without restricting the pilot's field of vision or normal operation of control systems within the airplane.

It should be understood, of course, that the foregoing disclosure relates to only a single preferred embodiment of the invention and that numerous modifications or alterations of the apparatus disclosed may be made without departing from the spirit and the scope of the invention as set forth in the appended claims.

What is claimed is:

1. A method of increasing an airplane pilot's resistance to angular acceleration forces which comprises lifting a pilot disposed in a normal sitting position in an airplane in flight, tilting him forward, and simultaneously pulling down upon the pilot's shoulders to place the pilot in a forwardly crouched position.

2. A method of increasing an airplane pilot's resistance to adverse acceleration forces which comprises lifting a pilot seated in an airplane in flight in response to a predetermined angular acceleration, tilting him forward, and simultaneously pulling down upon the pilot's shoulders to place the pilot in a modified sitting position consisting of a forwardly crouched position.

3. An improved airplane pilot's seat assembly comprising a seat unit normally supported in a conventional forward facing position, an adjustable seat supporting unit operable to move said seat from its normal position to a raised and forwardly tilted position, harness means extending over the pilot's shoulders and through fixedly supported pulley means to a suitable attaching means on said seat, a headrest arranged to support the pilot's head when the seat unit is in its normal position, and a chinrest arranged to support the pilot's chin when the seat unit is in its raised position.

4. An improved airplane pilot's seat assembly comprising a seat unit normally supported in a conventional forward facing position, an adjustable seat supporting unit, said supporting unit including a plurality of elongated rigid link members each pivotally connected at one end adjacent the forward edge of the seat unit and pivotally connected at the other end to relatively fixed supporting structure below the rear end of the seat unit and at least one extensible actuating unit pivotally connected at one end adjacent to the rear end of the seat unit and at the other end to fixed supporting structure beneath the forward edge of the seat unit and means arranged to regulate movement of said actuating means operable through said actuating means to move said seat from its normal position to a raised and forwardly tilted position, harness means for controlling the position of the pilot's shoulders, said harness means including a relatively rigid member extending across a pilot's shoulders and provided with attachment means at its opposite ends, a pair of cables each attached at one end to the attachment means at the ends of said rigid member and at its other end to opposite sides of said seat unit, and a plurality of pulley means rotatably attached to fixed supporting structure and arranged to receive the respective cables therethrough, whereby movement of said seat into a raised and tilted position causes a downward pull to be exerted upon the relatively rigid member of said harness means through the respective cables.

5. A device as described in claim 4, and in addition, a headrest attached to relatively fixed supporting structure and arranged to support the pilot's head from behind when the seat unit is in its normal position, and a chinrest attached to relatively fixed supporting structure and arranged to support the pilot's chin when the seat unit is placed in its raised and tilted position and the pilot has been pulled downwardly into a forwardly crouched position.

6. An airplane pilot's seat assembly movable from a conventional forward facing position to a raised and forwardly tilted position, said seat assembly comprising a seat unit normally supported in the forward facing position, an adjustable seat supporting unit operable to move said seat unit from its normal position to the raised and forwardly tilted position, and harness means extending over the pilot's shoulders and through fixedly supported pulley means to suitable attachment means on said seat unit, said pulley means being disposed forwardly of said seat unit and lower than said attachment means for the harness, whereby movement of said harness means with the seat unit as it is moved into the raised and forwardly tilted position exerts a forward and downward pull upon the pilot's shoulders to draw the pilot down into a forwardly crouched attitude.

References Cited in the file of this patent

UNITED STATES PATENTS

| | | |
|---|---|---|
| 604,677 | Humphrey | May 24, 1898 |
| 2,321,716 | Wahlberg | June 15, 1943 |

FOREIGN PATENTS

| | | |
|---|---|---|
| 703,809 | Germany | Mar. 17, 1941 |